(12) United States Patent
Holt et al.

(10) Patent No.: US 11,097,481 B2
(45) Date of Patent: Aug. 24, 2021

(54) STEREOLITHOGRAPHIC 3D PRINTER

(71) Applicant: PhotoCentriC Limited, Peterborough (GB)

(72) Inventors: Paul Holt, Peterborough (GB); David O'Brien, Peterborough (GB); Ed Barlow, Peterborough (GB)

(73) Assignee: PhotoCentriC Limited, Peterborough (GB)

( * ) Notice: Subject to any disclaimer, the term of this patent is extended or adjusted under 35 U.S.C. 154(b) by 0 days.

(21) Appl. No.: 16/424,852

(22) Filed: May 29, 2019

(65) Prior Publication Data
US 2019/0366635 A1 Dec. 5, 2019

(30) Foreign Application Priority Data
May 29, 2018 (GB) ..................................... 1808708

(51) Int. Cl.
| B29C 64/264 | (2017.01) |
| B33Y 30/00 | (2015.01) |
| B33Y 50/02 | (2015.01) |
| B29C 64/255 | (2017.01) |
| B29C 64/393 | (2017.01) |

(52) U.S. Cl.
CPC .......... *B29C 64/264* (2017.08); *B29C 64/255* (2017.08); *B29C 64/393* (2017.08); *B33Y 30/00* (2014.12); *B33Y 50/02* (2014.12)

(58) Field of Classification Search
None
See application file for complete search history.

(56) References Cited

U.S. PATENT DOCUMENTS

| 2015/0137426 A1 | 5/2015 | Van Esbroeck et al. |
| 2016/0046080 A1 | 2/2016 | Thomas et al. |
| 2017/0297261 A1* | 10/2017 | Schultheiss ............ B33Y 30/00 |
| 2018/0029296 A1* | 2/2018 | Van Esbroeck ....... B29C 64/129 |
| 2018/0154587 A1 | 6/2018 | Chen |
| 2019/0299534 A1* | 10/2019 | Fernandez Orive .. B29C 64/379 |

FOREIGN PATENT DOCUMENTS

| CN | 104191625 A | 12/2014 | |
| DE | 102012011610 A1 | 11/2012 | |
| EP | 3023230 A2 | 5/2016 | |
| JP | 06246838 A * | 9/1994 | .......... B29C 64/135 |
| WO | 2013/026087 A1 | 2/2013 | |
| WO | 2015/031227 A1 | 3/2015 | |
| WO | 2016/122408 A1 | 8/2016 | |
| WO | 2017/034129 A1 | 3/2017 | |

OTHER PUBLICATIONS

Translation of JP 6-246838 (Year: 1994).*

* cited by examiner

Primary Examiner — Marc C Howell
Assistant Examiner — John J DeRusso
(74) Attorney, Agent, or Firm — E. Eric Mills; Nexsen Pruet, PLLC

(57) ABSTRACT

A stereolithographic 3D printer comprising: a vat for liquid photopolymer; a print platform; a screen assembly having a screen support assembly supporting a screen for providing selective exposure of electromagnetic radiation for polymerising successive layers of photopolymer to build a 3D printed object on the print platform; and a control system for controlling the separation of the print platform and screen assembly parallel to a build direction, wherein the vat has a vat base that is resiliently deformable or has a resiliently deformable portion.

10 Claims, 6 Drawing Sheets

STEREOLITHOGRAPHIC 3D PRINTER

CROSS-REFERENCE TO RELATED APPLICATIONS

The presently disclosed subject matter is related to and claims priority to Great Britain Patent Application No. 1808708.0 entitled "STEREOLITHOGRAPHIC 3D PRINTER" filed on May 29, 2018; the entire disclosure of which is incorporated herein by reference.

TECHNICAL FIELD

This invention relates to 3D printers for making a 3D object by 3D printing, and in particular 3D printers where a 3D printed object is formed using electromagnetic radiation from a visual display screen or emissive pixel array screen.

BACKGROUND

Three-dimensional (3D) printing, also known as rapid prototyping or additive manufacturing, is a method of forming 3D objects by building up sequential layers, each defined using a respective digital representation. The digital representations may be formed by scanning a physical object in three-dimensions or may be formed by digitally sectioning a three-dimensional computer-aided design (CAD) image. Typically, the layers are of equal thicknesses.

In stereolithography apparatus printing (SLA), the printer builds 3D objects from successive layers of selectively polymerised liquid photosensitive polymer (resin), also referred to as photopolymer. The liquid photopolymer is polymerised (hardened) by an electromagnetic radiation exposure of an appropriate wavelength, e.g. visible light or near ultraviolet light.

To form a 3D printed object by stereolithographic 3D printing, a selective illumination of electromagnetic radiation is provided from an imaging source to form each layer, with the first layer being formed on a build platform, before the separation between the build platform and imaging source is increased by the thickness of a layer, and the next layer of selective polymerisation is formed on the preceding layer. The process of selective exposure and separation is repeated until the complete 3D printed object has been built-up.

Traditionally the photopolymer was selectively hardened by light emitted from a laser or by focusing the light from a digital light processing (DLP) projector emitted through its digital mirror device onto either the upper or lower layer of resin in a vat. This invention relates to the field of 3D printing where the image source is a visual display screen, most typically an LCD screen. It has recently become widely used by many manufacturers who have incorporated the screens as the digital mask to deliver custom polymerisation. LCD screens are particularly attractive as a driver for image creation in 3D printers because they are mass manufactured consumer items and are therefore available at very low cost. Furthermore, they generate very high-resolution images driven by the demand for higher and higher image quality on these devices. They also expose an entire layer of the vat simultaneously with relatively even light distribution without any requirement to refocus the light through a lens. They are available in a wide variety of formats from the very small screens used in near-eye headsets, through mobiles, tablets, monitors to TV screens. They are simpler to manufacture than competitive technologies. In the case of a laser 3D printer complex electronics and galvanometers are required, or in the case of a DLP printer a lens is often required to refocus the widening light beam back onto a smaller area. In contrast visual display screen device-based 3D printers are effectively composed from just an electronic driver board, a linear drive, a resin containment vat, a visual display screen and optionally a modified light generation source. In small format, when using mobile phone screens and the like, the printers can perform very reliably, but when increased in size the forces at the build interface as the polymer is detached from the vat film can be large and lead to the print failing. This invention describes novel methods to avoid such print failure. Previous methods are described as follows;

US2015137426A1 to Van Esbroeck et al, herein incorporated by reference in its entirety, describes methods for making 3D printed objects using a single dynamic mask such as an LCD array which is illuminated with radiation and describes two peeling mechanisms; a tilting and a sliding of the platform delivering lateral movement to detach a 3D printed object from the rigid base of vat.

WO 2017/034129 to Kim et al, herein incorporated by reference in its entirety, describes a vat made from polymethyl pentene film to enable better peeling.

SUMMARY OF THE DISCLOSURE

According to a first aspect; there is provided a stereolithographic 3D printer comprising:
a vat for liquid photopolymer;
a print platform;
a screen assembly having a screen support assembly supporting a screen for providing an exposure of patterned electromagnetic radiation for selectively polymerising successive layers of photopolymer to build a 3D printed object on the print platform; and
a control system for controlling the separation of the print platform and screen assembly parallel to a build direction,
wherein the vat has a vat base that is resiliently deformable or has a resiliently deformable portion.

The stereolithographic 3D printer may have a support face for contacting the vat base and a gulley provided in the support face of the screen support assembly for locating against the resiliently deformable vat base or resiliently deformable portion of the vat base.

The stereolithographic 3D printer may have a gulley that encircles the screen, or wherein the screen assembly comprises a plurality of screens and the gulley encircles the plurality of screens.

The gulley may comprise portions adjacent the screen, or the screen assembly may comprise a plurality of screens and the gulley may comprise gulley portions adjacent to the screens.

The screen support assembly may have a support face for contacting the vat base, and the control system may be configured to separate the support face from the vat base before the print platform is separated from the vat base, following a stereolithographic exposure.

The screen support assembly may have a support face for contacting the vat base, an inflatable chamber provided between the screen and the vat base and a control system comprising of a pump in fluid communication with the inflatable chamber, the control system being configured to inflate the inflatable chamber with the pump before the print platform is drawn away from the vat base or concurrently with the print platform being drawn away from the vat base, following a stereolithographic exposure.

The inflatable chamber may comprise of a seal encircling the screen or a plurality of screens that seals the screen support assembly to the vat base.

The inflatable chamber may comprise of an inflatable bag located between the screen or a plurality of screens and the resiliently deformable vat base or the resiliently deformable portion of the vat base.

The screen assembly may comprise of a plurality of screens, wherein the pump is in fluid communication with the inflatable chamber through one or more conduits extending through the screen support assembly between adjacent screens.

The control system may be configured to deflate the inflatable chamber with the pump, or wherein the control system may be configured to deflate the inflatable chamber by opening a release valve in fluid communication with the inflatable chamber.

The vat may comprise a vat side wall that is resiliently deformable, and the control system comprises an actuator for inwardly pressing portions of opposed resiliently deformable vat side walls before the print platform is drawn away from the vat base, following a stereolithographic exposure.

The control system may be configured to move the print platform perpendicular to the build direction relative to the vat base before the print platform is drawn away from the vat base, following a stereolithographic exposure.

According to a second aspect, there is provided a stereolithographic 3D printer comprising: a vat for liquid photopolymer;

a print platform;

a screen assembly having a screen support assembly supporting a screen for providing an exposure of patterned electromagnetic radiation for selectively polymerising successive layers of photopolymer to build a 3D printed object on the print platform; and a control system for controlling the separation of the print platform and screen assembly parallel to a build direction, wherein the printer is configured to space apart the screen from the liquid photopolymer during printing.

The vat may comprise of a vessel having a vessel wall for immersing in the photopolymer with the exposure window between the screen and the print platform, wherein the vessel wall is resiliently deformable or has a resiliently deformable portion.

The control system may be configured to control the depth of photopolymer in the vat and to space apart the screen from a free surface of the photopolymer.

DESCRIPTION OF THE DRAWINGS

Examples are further described hereinafter with reference to the accompanying drawings, in which.

DETAILED DESCRIPTION

In the described examples, like features have been identified with like numerals, albeit in some cases having one or more of: increments of integer multiples of 100; and suffix letters. For example, in different figures, 124, 224, 324, 424, 524, 624, 724 and 824 have been used to indicate a print platform.

Figure 1:
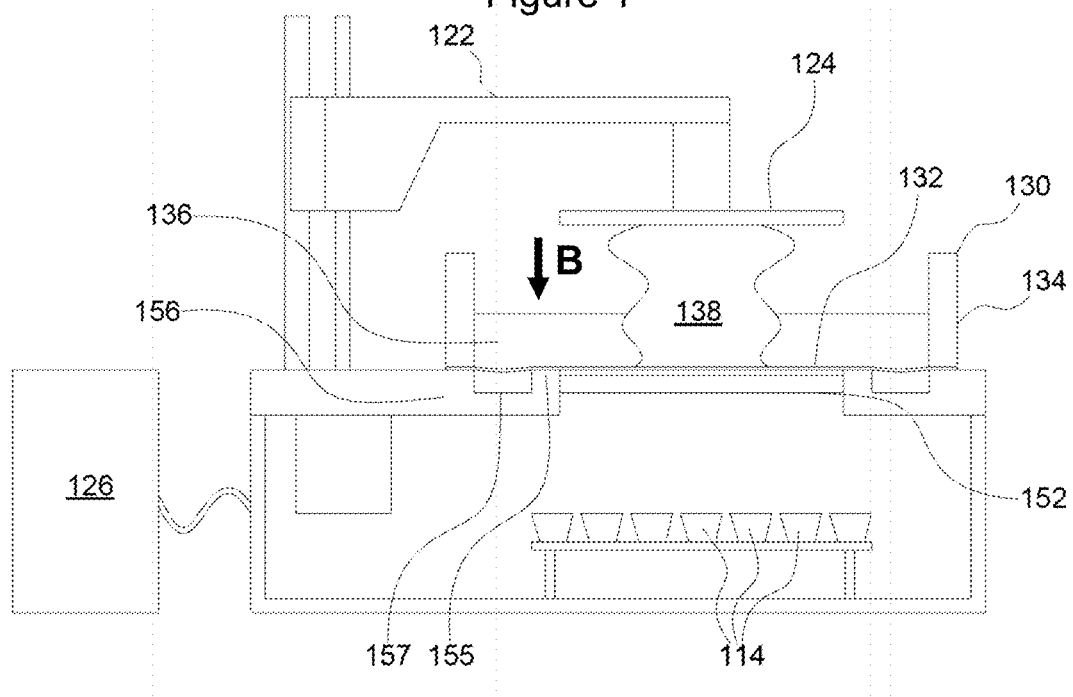
FIG. 1 shows a first stereolithographic 3D printer, having a gulley.

FIG. 1 shows a cut-away side view of a first stereolithographic 3D printer (three-dimensional printer) with a control system 126 and a photopolymer vat 130 supported on the base. The printer contains the light source 114 that emits electromagnetic radiation for polymerising liquid photosensitive polymer in the vat, e.g. visible light or ultraviolet light. The screen assembly has a screen 152 (or a plurality of screens) connected to the screen support assembly 156, e.g. received into an alignment recess of the screen support assembly. The screen and the screen support assembly provide a substantially flush surface for abutting with the outer surface of the vat base 132.

A gulley 157 is provided in the abutting surface 155 of the screen support assembly, the gulley being arranged for positioning against the outer surface of the vat base. In the illustrated printer, the gulley 157 extends along each side of the screen 152, fully encircling the screen (like a castle moat). Alternatively, gulley sections may be provided adjacent the screen, e.g. a gulley section may be provided on each of two opposed sides of the screen. In the case that the screen assembly supports a plurality of screens, an encircling gully or one or a plurality of adjacent gulley sections may be provided adjacent each screen, and an encircling gulley may additionally or alternatively be provided around the plurality of screens.

The gulley (or gulley sections) provides a reservoir of air or other fluid directly adjacent to the screen or plurality of screens which can enable the lifting of the vat base more easily during the peeling process.

The light source may be configured to emit electromagnetic radiation that is desirably collimated or approximately collimated (preferably a divergence of less than 15°, e.g. less than 5°), and oriented substantially perpendicular to the screen.

The movement control system has a motorised arm 122 supporting a print platform 124, on which a 3D printed object 138 (or a plurality of 3D printed objects) is formed, and a controller for controlling the relative movement parallel to the build direction B (the direction in which successive layers of the 3D printed object are laid down) of any of the print platform, the vat and the screen.

The vat 130 has a vat base 132 and vat walls 134. In use, the vat is provided with a supply of liquid photopolymer 136 for use in building the 3D printed object(s). The vat base of the vat has a high transmissivity of electromagnetic radiation at a wavelength at which the photopolymer polymerises (e.g. it may be substantially transparent across a broad range of wavelengths).

In the illustrated 3D printer, the vat base is resiliently deformable, i.e. the vat base is not substantially rigid, but flexes to a limited extent. The vat base may deform under the operating pressures that it experiences in the course of typical use. The vat base 132 should be flexible and desirably have a thickness of 10 mils (254 microns) or less. Though in reality, thicknesses slightly above this can be used.

The vat base may suitably be a film of chemical composition Polymethylpentene (PMP), Fluorinated Ethylene Propylene (FEP), Perfluroalkoxy (PFA), Ethylene Chlorotrifluoroethylene (ECTFE), Polyvinylidene Fluoride (PVDF), Polypropylene (PP) or Polyester (PET). These films may be provided onto a substrate as monofilms or co-extrusions or laminates. Alternatively, the vat base may be provided with a very low energy surface on the inner surface, in contact with the photopolymer to reduce adhesion of the 3D printed objects to it, for example being treated with silanes, silicones, silsesquioxanes or the like. Specifically, the silicone coating may be polydimethylsiloxane (PDMS), for example Sylgard® 184 manufactured by the Dow Chemical Company.

The light source 114 emits electromagnetic radiation for polymerising photopolymer (e.g. it may emit a broad wavelength range including the wavelength(s) at which the photopolymer polymerises).

In the illustrated 3D printer, the screen is an LCD screen, containing an array of pixels, each of which has a controllable optical transmissivity at the wavelength(s) at which the photopolymer polymerises, e.g. each pixel has a transmissivity that may be selectively controlled to be substantially transparent or substantially opaque, and may additionally be set to one or more intermediate levels of transmissivity. In the illustrated LCD screen, the pixels in the screen are arranged in an array with a 47 µm pixel pitch in each of the x- and y-directions.

The screen may be a (non-emissive) visual display screen for use with backlighting, e.g. a separate light source, or backlighting that is built-into the screen. In a further alternative, the screen may be an emissive pixel array screen, i.e. the screen may be selectively light emitting, for example being a light emitting diode (LED) screen comprising an array of pixels, each of which has a controllable optical emission at the wavelength(s) at which the photopolymer polymerises. For example, the LED screen may be an organic light-emitting diode (OLED) screen, which may have a high pixel density.

The visual display screen or emissive pixel array screen may be of the following types: Liquid Crystal Display (LCD), Light Emitting Diode (LED), Electronic paper (E Ink), Electroluminescent display (ELD), Plasma Display Panel (PDP) or Organic Light Emitting Diode Display (OLED). In the illustrated printer, a plurality of light sources is shown, each of which may be separately collimated, desirably having an emission angle of 15° or less. Alternatively, a single light source may be used. A lens may be provided for collimating the or each light source, e.g. a Fresnel lens or an array of generally lenticular lenses.

In the case that the screen assembly has a plurality of screens, the screens may be arranged in an orthogonal two-dimensional array of screens. Alternatively, the plurality of screens may be a single line of screens. The plurality of screens may be tessellated in rows with an offset between successive rows (e.g. each row is offset by half a screen width or length, in a similar manner to "header bond" brickwork). The plurality of screens may be arranged in a spiral pattern or pattern of concentric rings.

In the illustrated 3D printer, under the control of the controller 126, the motorised arm 122 is adapted to raise and lower the print platform 124 relative to the vat base 132 of the vat 130, providing relative movement parallel to the build direction B, perpendicular to the horizontal surface of the liquid photopolymer in the vat, in use. Alternatively, or additionally, the printer may be configured to lower and raise the vat base 132 relative to the print platform. By either, or both, approaches, the relative separation (i.e. in the z-axis, perpendicular to the build surface of the build platform) between the face of the print platform 124 and the vat base 132 of the vat 130 may be controllably varied in response to control signals from the controller 126.

In use, a supply of liquid photopolymer 136 is provided in the vat 130. The print platform 124 is positioned close to, and parallel with, the vat base 132, e.g. the print platform is spaced apart from the vat base by a layer thickness of the 3D printed object, e.g. less than 100 µm, e.g. 50 µm. The layer of liquid photopolymer 136 between the print platform and the vat base 132 is exposed to selective illumination provided by the screen 152 and the light source 114, with the screen being controlled by the controller 126. Digitally controlled photopolymerisation occurs in the layer of photopolymer adjacent the vat base 132, corresponding with the exposure pattern.

The print platform 124 is then moved to a new position (e.g. raised) in which it is separated from the vat base 132, e.g. either being moved by the thickness of a further layer of the 3D printed object, directly into position relative to the screen 152 for the next stereolithographic exposure, or initially being moved further from the vat base to induce peeling of the 3D printed object from the vat base, before moving into position for the next stereolithographic exposure. Then a further layer of liquid photopolymer is exposed to a respective pattern of exposure from the screen 152 and light source 114, and the process is repeated, to build-up successive layers of the 3D printed object(s). Although described in relation to a backlit (non-emissive) visual display screen that emits selective illumination, it will be appreciated that a corresponding 3D printing process may alternatively be provided by an emissive pixel array screen.

In the illustrated 3D printer, the vat base is illuminated from below, forming the 3D printed object on the underside of a print platform, as the print platform rises away from the vat base. However, alternatively, the print platform may be submerged in a vat of photopolymer, and through successive exposures a 3D printed object may be built on the print platform (e.g. the print platform may be horizontal with the 3D printed object formed on the upper surface).

The photopolymer can be of any type that will harden with light of the intensity and wavelength of the light source. It can be acrylate, epoxy based or another form of chemistry. It can be free radically cured in small format printers or may be cationically cured in larger format printers. The unreacted liquid photopolymer that remains in the vat after the 3D printed object has been made can be re-used. After printing, the 3D printed object is drained and washed in a solvent, e.g. alcohol, e.g. IPA, or detergent and water. After cleaning, a post processing procedure involving blanket illumination of light and optionally heat is provided to fully harden the object and leave it dry to touch.

Figure 2A:
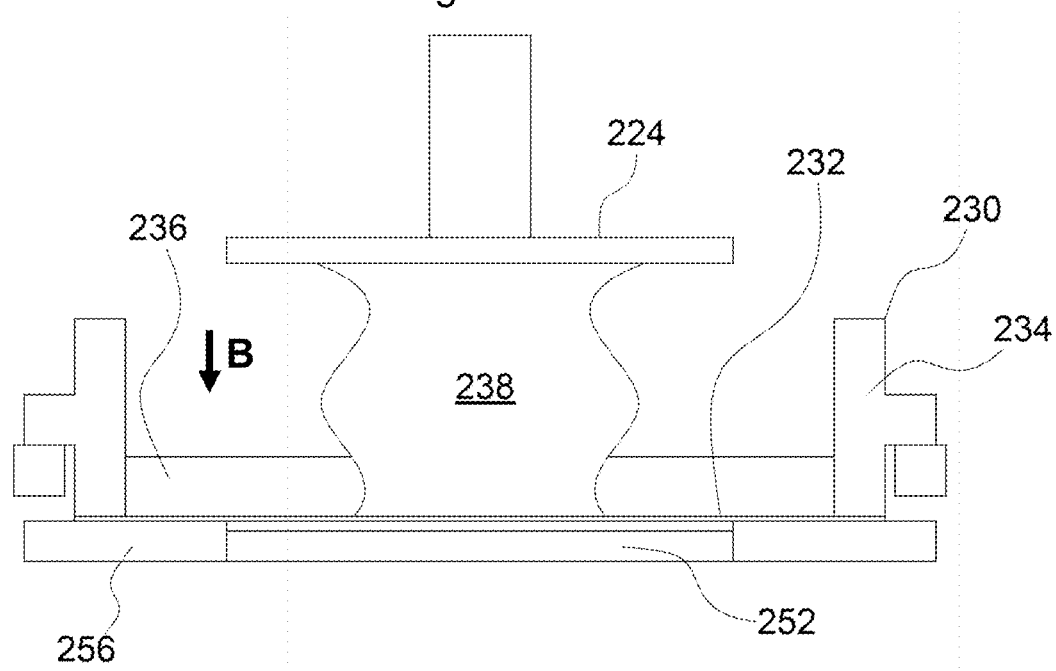
FIGS. 2A to 2C show cut-away side views of part of a second stereolithographic 3D printer.

FIG. 2A shows a cut-away side view of part of a second stereolithographic 3D printer, which is generally similar to the first 3D printer shown in FIG. 1 and the description of like features and operations is omitted. The illustrated second 3D printer (optionally) omits the gulley 157 of the first 3D printer shown in FIG. 1.

Figure 2B:
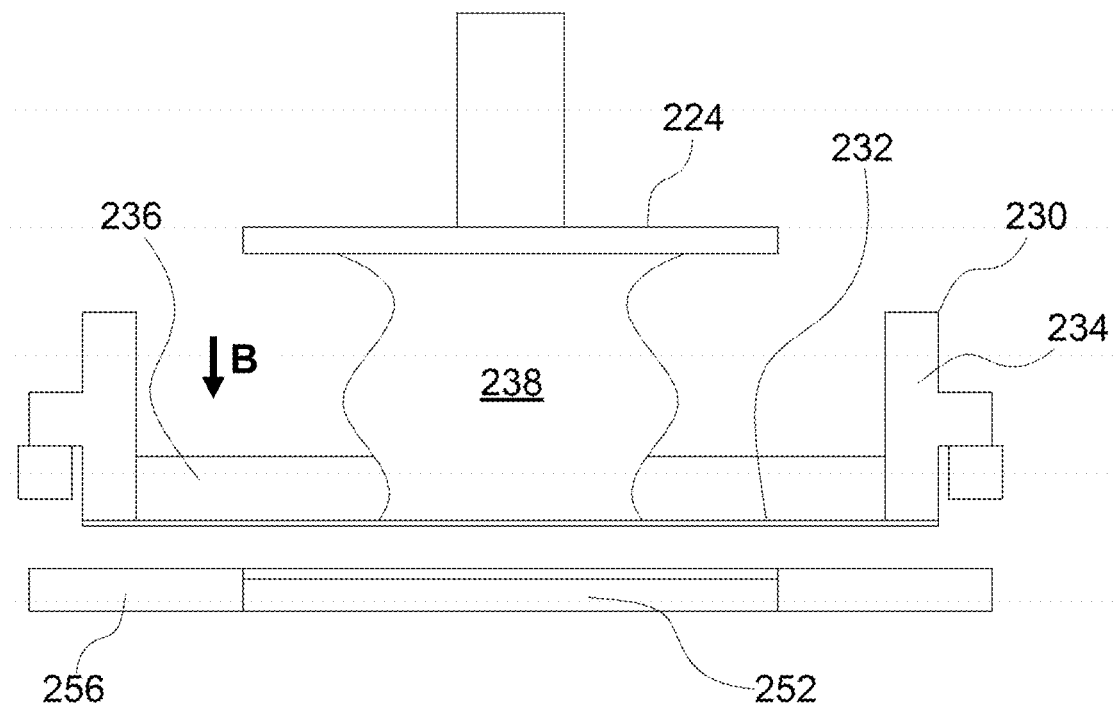

FIG. 2A shows the position of the 3D printer during a stereolithographic exposure of a layer of a 3D printed object 238. Once a stereolithographic exposure has occurred, the control system of the second 3D printer is configured to separate the vat 230 from the screen support assembly 256, as shown in FIG. 2B. Once the screen support assembly 256 has been moved away from the vat base 232, the vat base flexes (e.g. sags slightly) under the weight of the photopolymer 236 in the vat 230.

Detachment of the 3D printed object from the vat base is promoted by the vat base flexing to create a small angle (relative to the screen), e.g. corresponding with an inclination of the vat base of a few degrees at the vat side wall.

Figure 2C:
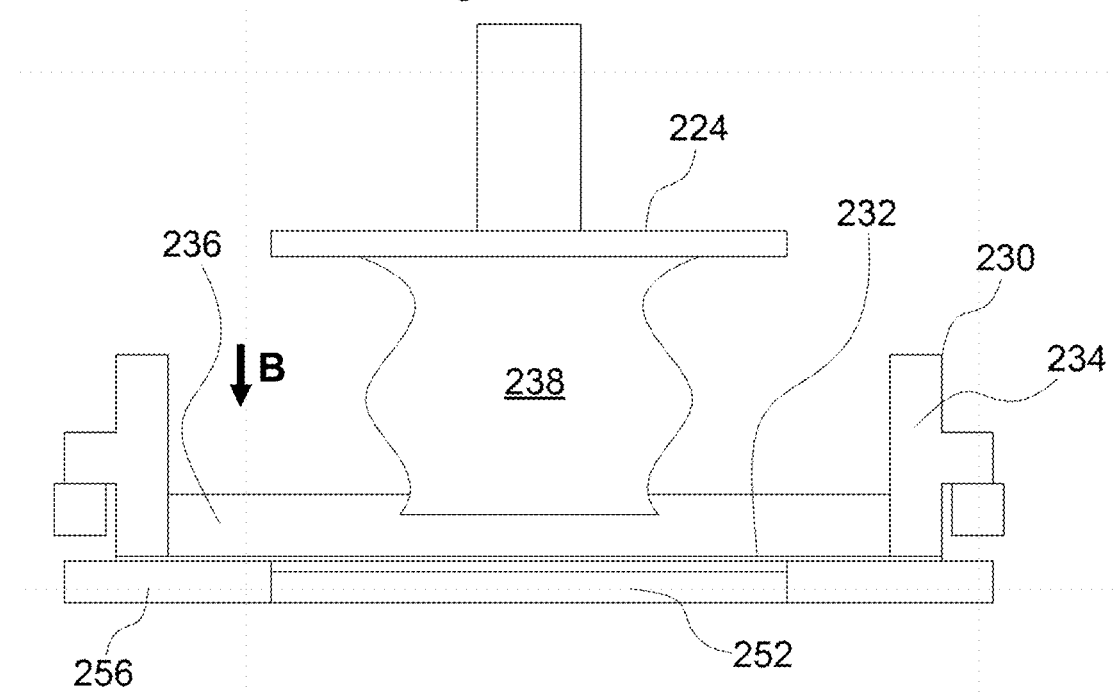

Subsequently, the printing platform 224 and the vat base 232 are moved apart, either by raising the print platform 224 or by lowering the vat 230 (as shown in FIG. 2C). This will induce peeling of the vat base 232 from the 3D printed object 238 without excessive force, reducing the chances of delamination between layers of the 3D printed object. The vat base 232 will initially detach from the 3D printed object 238 at the perimeter of the latter, and the area of contact between the two will diminish smoothly until complete detachment is achieved, eg over a period of 2 seconds or less.

The screen support assembly 256 and the external surface of the vat base 232 are returned into contact before the next stereolithographic exposure, to support the vat base, once again providing a flat interior surface of the vat base upon which to form the next layer of the 3D printed object 238.

Figure 3A:
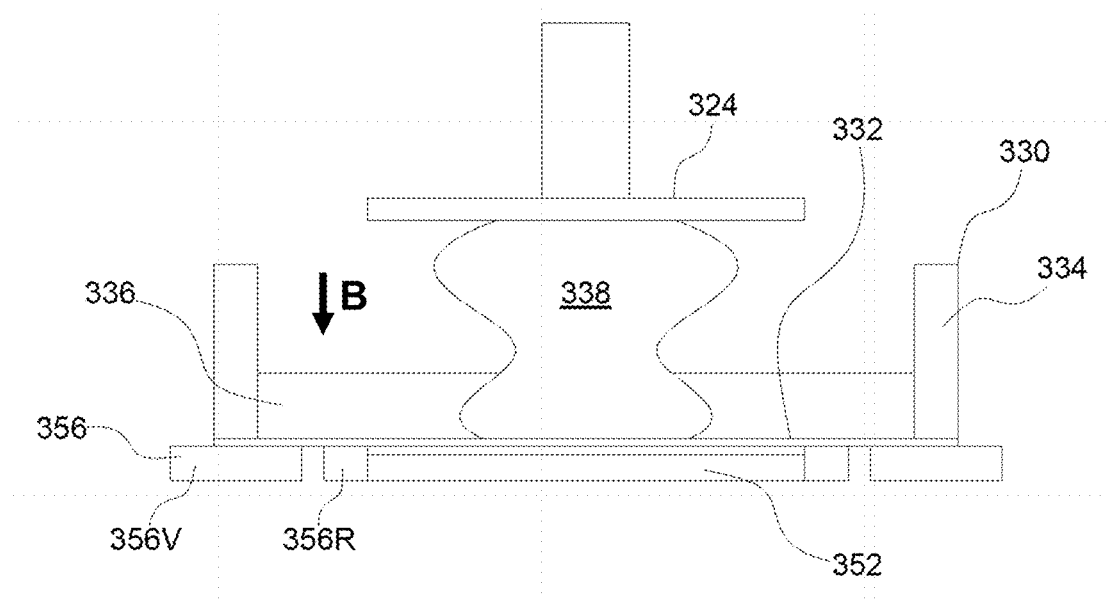
FIGS. 3A and 3B show cut-away side views of part of a third stereolithographic 3D printer.

FIG. 3A shows a cut-away side view of part of a third stereolithographic 3D printer, which is generally similar to the second 3D printer in FIGS. 2A to 2C, and the description of like features and operations is omitted.

The printer has a composite screen support assembly 356, having a vat supporting part 356V and a retractable part 356R supporting the screen 352, the screen assembly being configured for the retractable part to be moved away from the vat 330, relative to the screen support assembly 356.

Figure 3B:
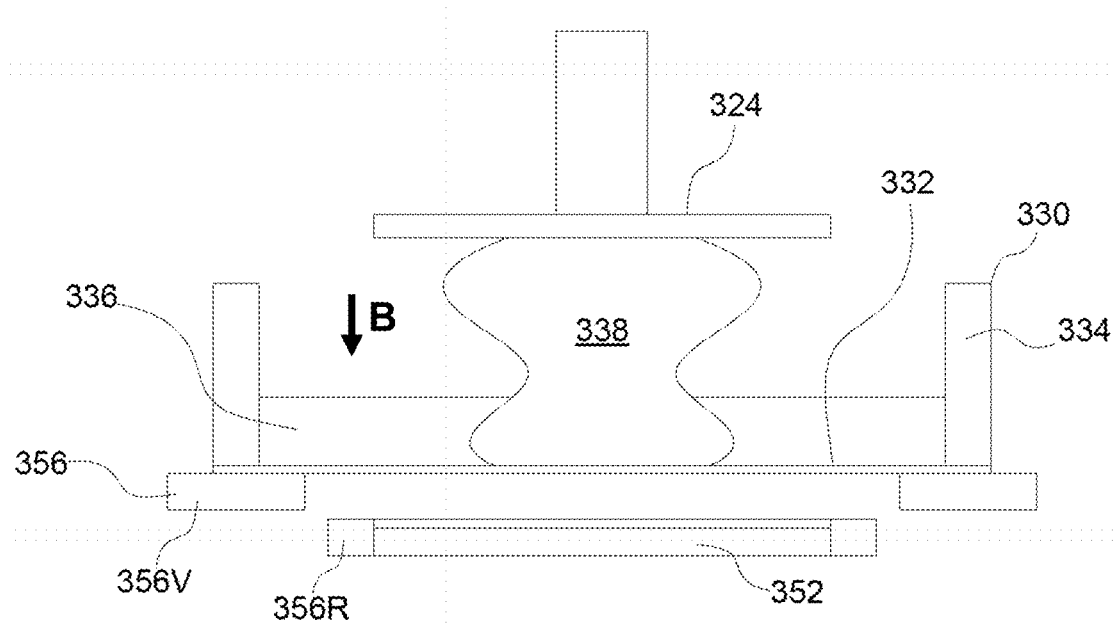

FIG. 3A shows the position of the 3D printer during a stereolithographic exposure of a layer of a 3D printed object 338. Once a stereolithographic exposure has occurred, the control system of the third 3D printer is configured to retract the retractable part 356R of the composite screen support assembly 356 from the vat 330, as shown in FIG. 3B. Once the retractable part 356R has been moved away from the vat base 332, the vat base flexes (e.g. sags slightly) under the weight of the photopolymer 336 in the vat 330, promoting peeling of the 3D printed object 338 from the vat base 332. Subsequently, the printing platform 324 is moved away from the vat base 332, e.g. either being moved directly into position for the next exposure, or initially being moved further from the vat base to induce peeling of the vat base 332 from the 3D printed object 338, before moving into position for the next exposure.

The retractable part 356R is returned into position, providing a flush support surface for the vat 330 with the vat supporting part 356V, before the next stereolithographic exposure, once again providing a flat interior surface of the vat base 332 upon which to form the next layer of the 3D printed object 338.

Figure 4:
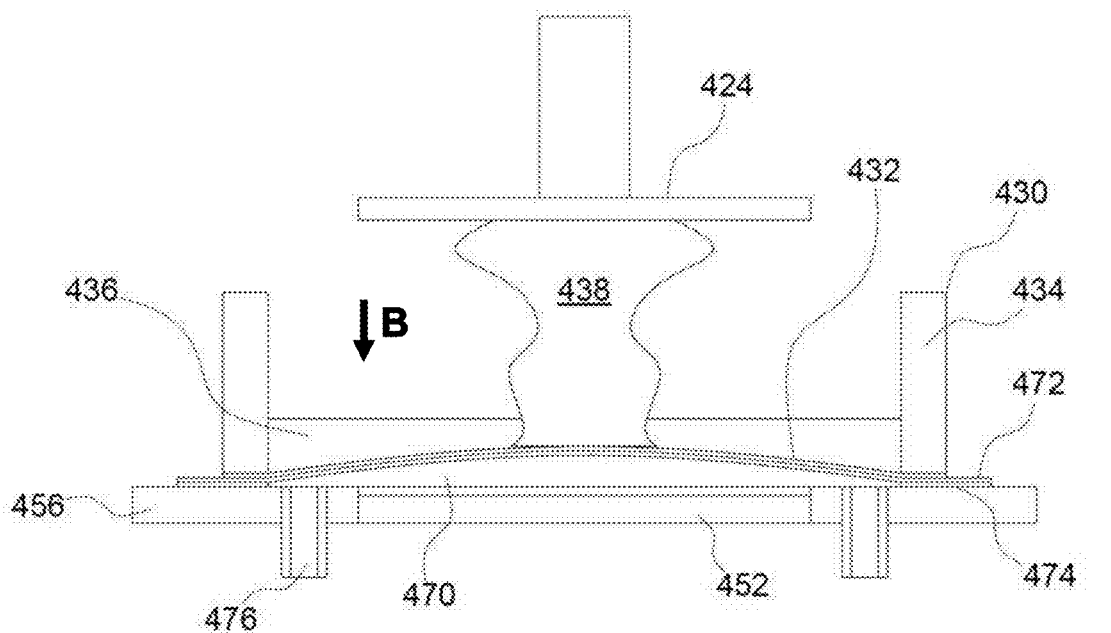
FIG. 4 shows a cut-away side view of part of a fourth stereolithographic 3D printer, having an inflatable chamber.

FIG. 4 shows a cut-away side view of part of a fourth stereolithographic 3D printer, which is generally similar to the first 3D printer shown in FIG. 1, and the description of like features and operations is omitted. The illustrated fourth 3D printer (optionally) omits the gulley 157 of the first 3D printer shown in FIG. 1.

The fourth 3D printer has an inflatable chamber 470 provided between the screen 452 and the vat base 432. In the illustrated printer, the inflatable chamber 470 is formed by a resiliently deformable membrane 472 sealed to the screen assembly by a seal 474 (e.g. a gasket or O-ring), and is coupled to an inflation pump (not shown) by one or more conduits 476, which may extend through the screen support assembly 456.

In use, after a stereolithographic exposure of a layer of a 3D printed object 438, the inflatable chamber 470 is inflated by the inflation pump, as shown in FIG. 4. The inflation of the inflatable chamber 470 causes distention of the vat base 432, e.g. the centre of the chamber 470 may expand by a few millimetres if unobstructed.

As the chamber 470 inflates, the control system is configured to move the print platform 424 away from the screen 452. Moving the print platform 424 away from the screen 452 promotes peeling of the vat base 432 from the printed object 438. The amount by which the print platform 424 is moved away from the screen 452 may be determined by the control system, as a function of the contact area(s) and contact location(s) of the 3D printed object 438 on the vat base 432, e.g. based on data about the preceding stereolithographic exposure. The extent to which the chamber 470 is inflated may also be a function of the strength of the previously formed 3D printed object, e.g. the force may be desirably greater in objects where there has been a large amount of light emitted on the current layer enabling a large area of build interface.

Subsequently, the printing platform 424 is moved further away from the vat base 432 to induce peeling. The vat base 432 will initially detach from the 3D printed object 438 at the perimeter of the latter, and the area of contact between the two will diminish smoothly until complete detachment is achieved, eg over a period of 2 seconds or less.

The inflatable chamber 470 is deflated again before the next stereolithographic exposure. With the vat base 432 supported on the screen assembly 456, there is once again a flat interior surface of the vat base upon which to form the next layer of the 3D printed object 438. The inflatable chamber 470 may be deflated by opening a pressure release valve in fluid communication with the inflatable chamber, e.g. with the chamber 470 being deflated under the weight of the vat 430 and photopolymer 436. Alternatively, the seal 474 may be an imperfect seal, and the chamber may be deflated under the weight of the vat 430 and photopolymer 436. In a further alternative, the chamber 470 may be deflated by use of the inflation pump, or by a second, deflation pump.

Alternatively, the resiliently deformable membrane 472 may be omitted, and the inflatable chamber may be provided by sealing the vat base 432 to the screen support assembly 456.

In a further alternative, the inflatable chamber may be provided by an inflatable pillow provided between the vat base 432 and the screen 452. In each alternative, the inflatable chamber is again in fluid communication with an inflation pump and may be in fluid communication with a pressure release valve.

Figure 5A:
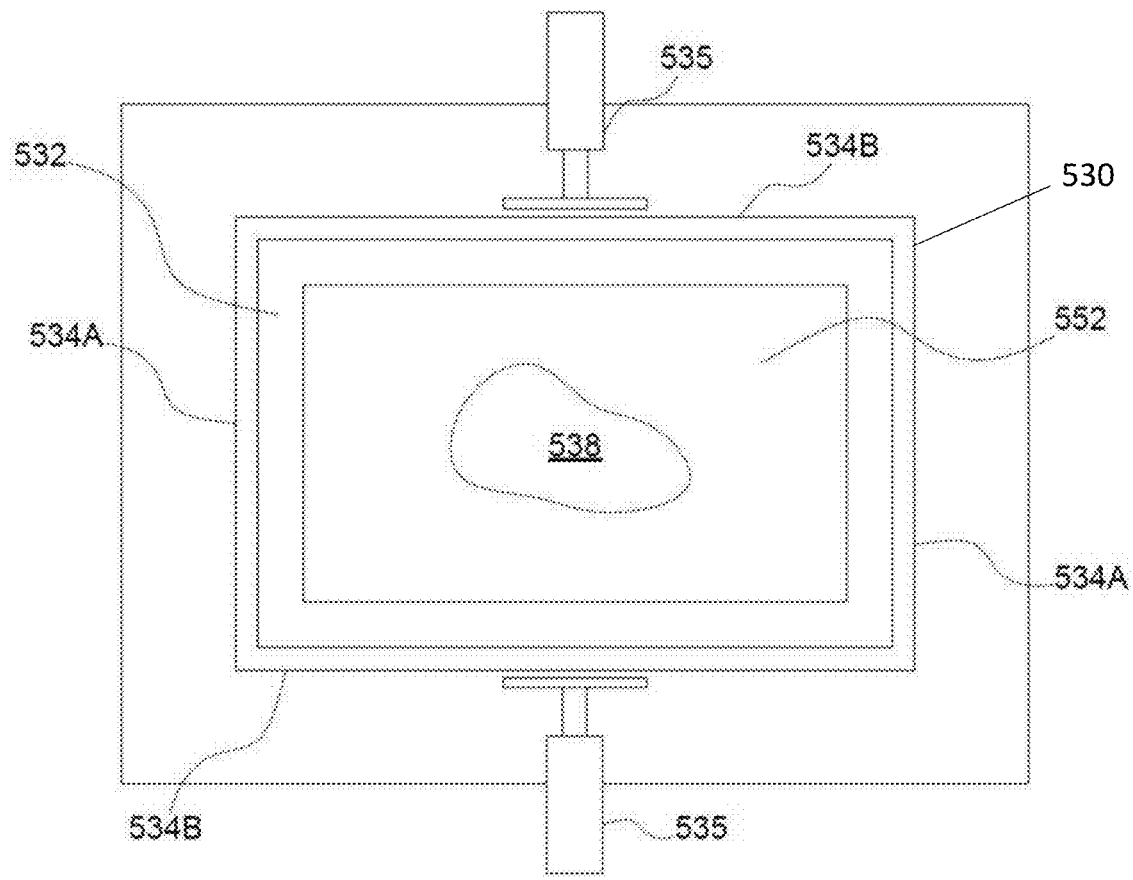
FIGS. 5A and 5B show plan views of part of a fifth stereolithographic 3D printer, having resiliently deformable vat side walls.
Figure 5B:
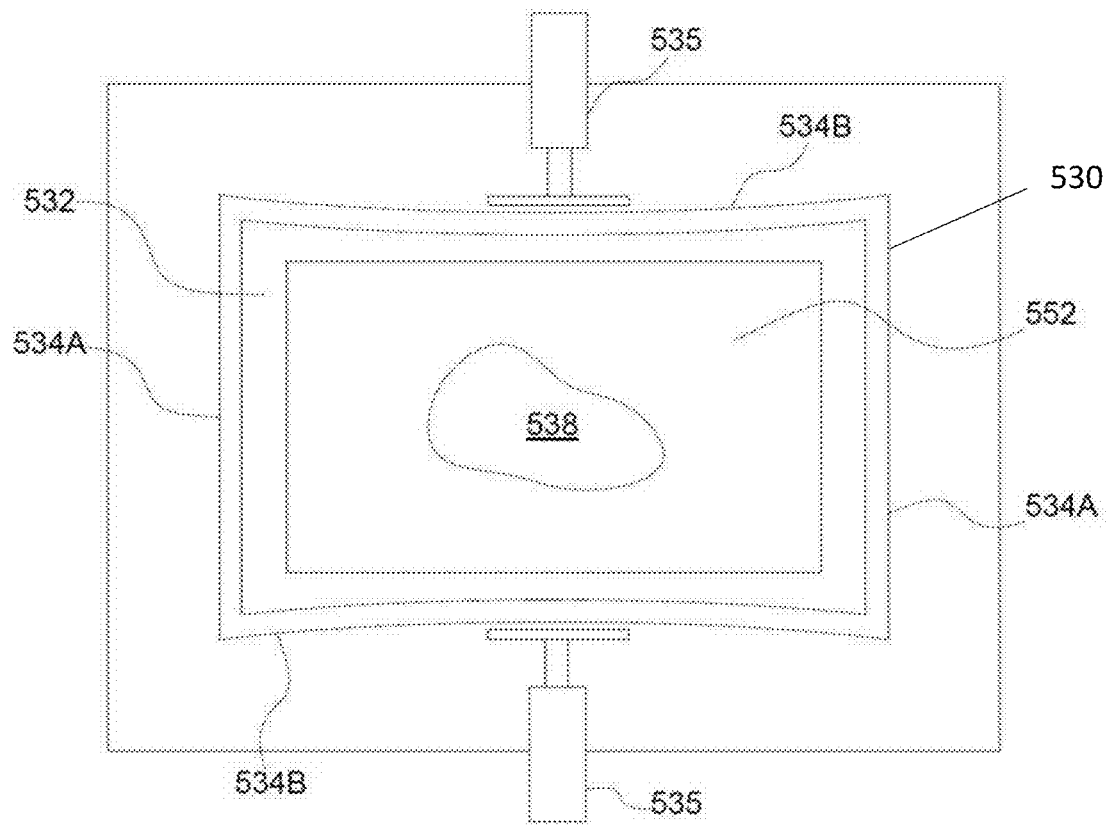

FIGS. 5A and 5B show plan views of part of a fifth stereolithographic 3D printer, which is generally similar to the first 3D printer shown in FIG. 1, and the description of like features and operations is omitted. The illustrated fifth 3D printer (optionally) omits the gulley 157 of the first 3D printer shown in FIG. 1.

The illustrated fifth 3D printer has a vat 530 with opposed resiliently deformable walls 534B and a resiliently deformable base 532 (e.g. the vat may be formed from a resiliently deformable acrylic material). Further opposed walls 534A of the vat 530 may additionally be resiliently deformable. The printer is additionally provided with actuators 535 for pushing inwardly on opposed resiliently deformable walls 534B of the vat 530, in response to control signals from the control system.

In use, during each stereolithographic exposure of a layer of a 3D printed object 538 the resiliently deformable walls 534B are in a relaxed state, as shown in FIG. 5A. After each stereolithographic exposure of a layer of the 3D printed object 538, before the print platform is moved away from the vat base 532, the actuators 535 are actuated by the control system to push inwardly onto each of the opposed resiliently deformable walls 534B, causing distention of the vat base. As the vat base is tensioned to the vat walls, a deformation of the vat walls provides not only a distention of the vat base, but also a positive tensioning of the base in a linear rather than planar fashion. This causes a deliberate creasing of the vat base.

It forces air to be drawn from outside the vat walls or from a gulley inside the vat walls or from another air supply located within the vat walls to further enable movement of the vat base to aid in the peeling of the vat base from the 3D printed object. Subsequently, the printing platform is moved away from the vat base 532, e.g. either being moved directly into position for the next stereolithographic exposure, or initially being moved further from the vat base to induce peeling of the vat base 532 from the 3D printed object 538, before subsequently moving to the next exposure position. The actuators 535 are withdrawn and the resiliently deformable side walls 534B return to their relaxed state positions before the next stereolithographic exposure, with the vat base 532 returning to its tensioned state.

Figure 6:
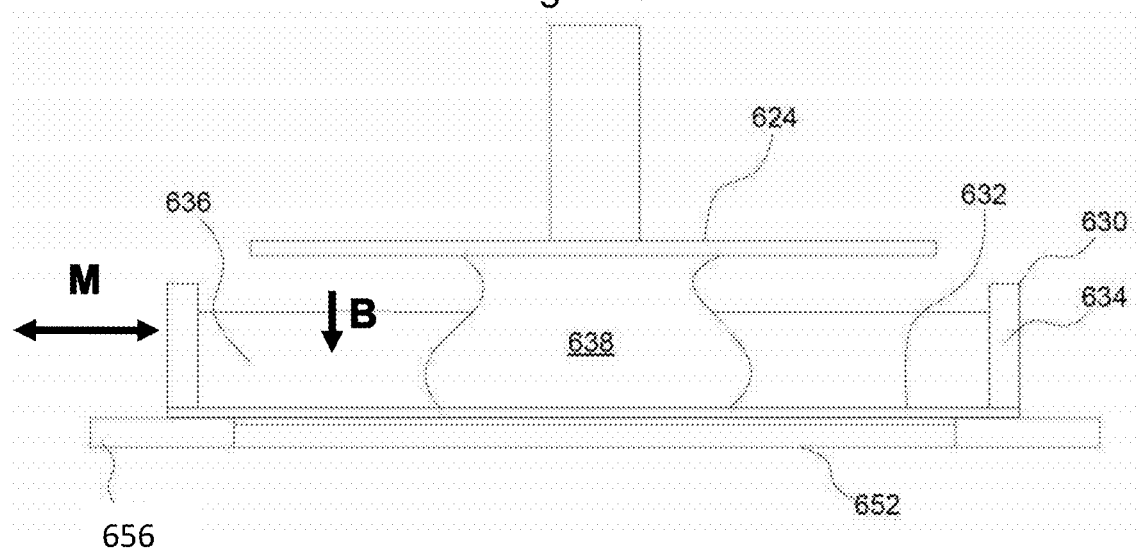
FIG. 6 shows a cut-away side view of part of a sixth stereolithographic 3D printer, having a means of lateral movement of the print plate relative to the vat.

FIG. 6 shows a cut-away side view of part of a sixth stereolithographic 3D printer, which is generally similar to the first 3D printer shown in FIG. 1, and the description of like features and operations is omitted. The sixth 3D printer (optionally) omits the gulley 157 of the first 3D printer shown in FIG. 1.

In the sixth 3D printer, the control system is configured to move the print platform 624 laterally (perpendicular to the build direction B) relative to the vat base 632, e.g. the print platform is supported by a motorised arm configured to move the print platform laterally.

In use, following each stereolithographic exposure, the print platform 624 is moved laterally relative to the vat base 632, overcoming any chemical or physical adhesion between the 3D printed object 638 and the vat base 632. The resiliently deformable vat base may deform (e.g. stretch) during the lateral movement. Subsequently, the printing platform 624 is moved away from the vat base 632, e.g. either being moved directly into position for the next stereolithographic exposure, or initially being moved further from the vat base to induce peeling of the vat base 632 from the 3D printed object 638, before moving into position for the next exposure.

Before the next stereolithographic exposure, the printing platform 624 may be returned laterally to the original relative alignment of the print platform and vat base 632. Alternatively, for the next stereolithographic exposure, the digital image on the screen for the next stereolithographic exposure may be the laterally offset with respect to the preceding digital image, reducing total manufacturing time.

The preceding 3D stereolithographic printers shown in FIGS. 1 to 6 have been illustrated in orientations in which a print platform rises out of a vat, with a build direction B that is vertically upwards, with the 3D printed object being formed by stereolithographic exposures from beneath a horizontal transparent or partially transparent, resiliently deformable base of the vat (a 'bottom-up' arrangement). However, it will be appreciated that the operations of the preceding printers may be adapted to promote peeling of a 3D printed object in which the build direction and vat have other orientations, e.g. with a horizontal vat containing resin that is illuminated from above and a build direction that is vertically downwards (a 'top-down' arrangement).

Figure 7:
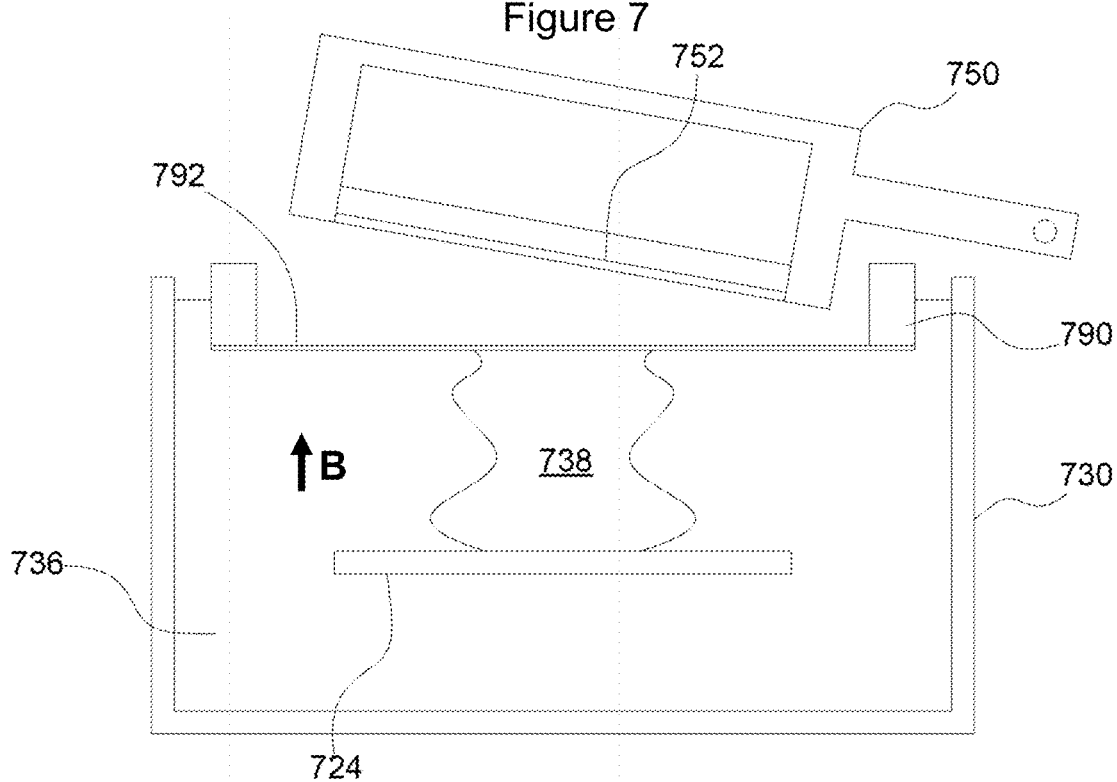
FIG. 7 shows a cut-away side view of part of the seventh stereolithographic 3D printer, having an immersible, resiliently deformable transmission window.

FIG. 7 shows a cut-away side view of part of a seventh stereolithographic 3D printer, having an immersible window assembly 790, shortly after a stereolithographic exposure.

The printer has a printer base, a control system, and a vat 730 supported on the base. In use, the vat 730 is provided with a supply of liquid photopolymer 736 for use in building the 3D printed object(s) 738. The immersible window assembly 790 has a resiliently deformable transmission window 792 provided within the vat 730, immersed into the photopolymer 736. The transmission window 792 of the immersible window assembly 790 has a high transmissivity to electromagnetic radiation at a wavelength at which the photopolymer 736 polymerises (e.g. it may be substantially transparent across a broad range of wavelengths).

In the illustrated 3D printer, the transmission window 792 is resiliently deformable, i.e. the transmission window is not substantially rigid, but flexes to a limited extent. The transmission window 792 may deform under the operating pressure that it experiences in the course of typical use, e.g. when immersed in the photopolymer. The transmission window 792 may be formed from any film that is optically transparent and desirably has both low surface energy and high elasticity, such as PMP, FEP, PFA, PDDF or ECTFE. Here, the most recently built layer of the object separates from the window by peeling at the perimeter after the screen has retracted and enabled air to flow in instead. While the screen is in contact with the film there is no air behind it and the film acts like a rigid surface.

As with the vat bases of the earlier printers, the transmission window 792 may be provided with a very low energy surface on the outer surface (facing the photopolymer 736, in use) to reduce adhesion of the 3D printed objects 738, in use.

The control system controls the position of the print platform 724 on which a 3D printed object 738 (or a plurality of 3D printed objects) is formed, in use, relative to the transmission window 792, in the build direction B (e.g. print platform 724 may be lowered, or the transmission window 792 may be raised). Accordingly, the relative separation (i.e. in the z-axis, perpendicular to the build surface of the build platform 724) between the build surface of the print platform and the transmission window 792 may be controllably varied in response to control signals from the control system. The control system is also configured to move the screen assembly 750 relative to the transmission window 792. In use, the control system is configured to bring the screen 752 into contact with the transmission window 792, for each exposure from the screen 752, to flatten the transmission window, to provide a flat exterior surface of the transmission window upon which to form a layer of the 3D printed object 738.

FIG. 7 shows the position of the 3D printer after the stereolithographic exposure of a layer of a 3D printed object 738. Once a stereolithographic exposure has occurred, the control system of the seventh 3D printer is configured to separate the screen assembly 750 from the interior surface of the transmission window 792, e.g. by rotating the screen assembly about a hinge (as shown in FIG. 7) or by lifting the screen assembly in the build direction B. Once the screen assembly 750 has been moved away from the transmission window 792, the transmission window 792 flexes (e.g. bows upwards slightly) under the hydrostatic pressure of the photopolymer 736 in the vat 730, promoting peeling of the 3D printed object 738 from the transmission window 792. Subsequently, the printing platform 724 is moved away from the transmission window 792, e.g. either being moved directly into position for the next stereolithographic exposure, or initially being moved further from the transmission window to induce peeling of the transmission window 792 from the 3D printed object 738 before moving into position for the next exposure.

The screen assembly 750 and the internal surface of the transmission window 792 are returned into contact again before the next stereolithographic exposure, once again providing a flat exterior surface of the transmission window upon which to form the next layer of the 3D printed object 738.

Figure 8:
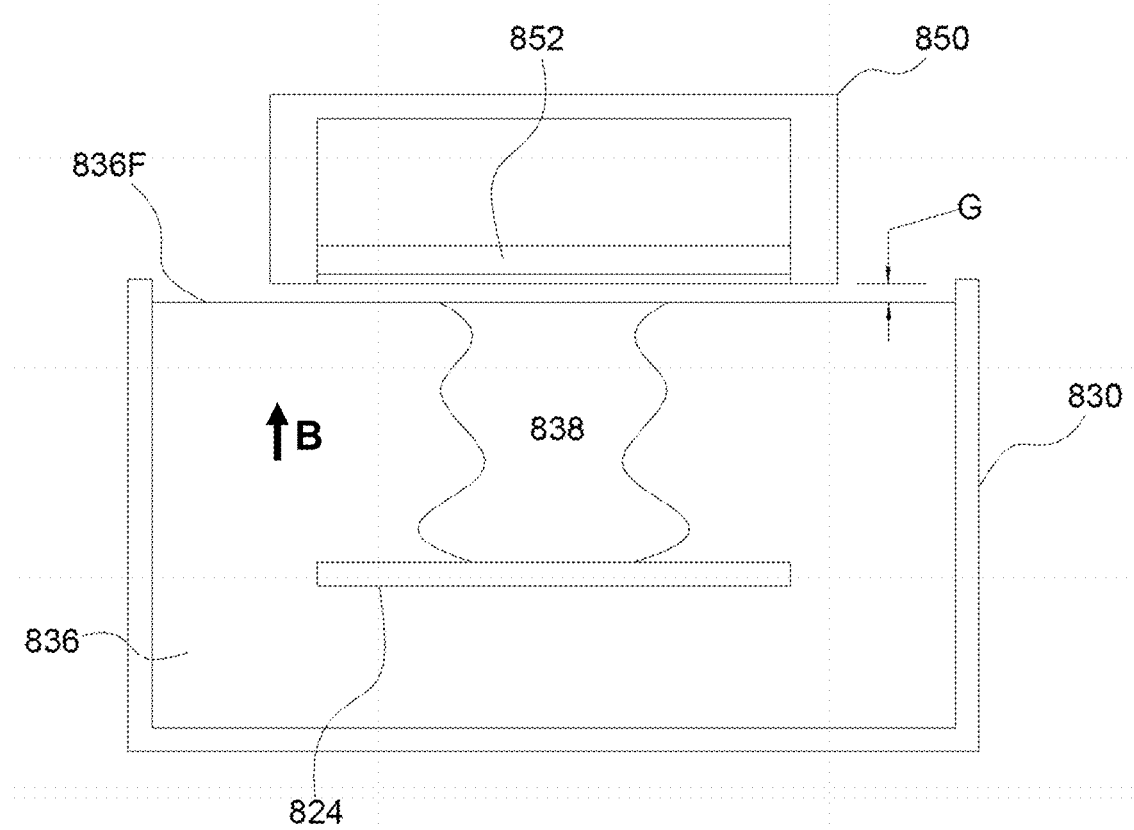
FIG. 8 shows a cut-away side view of part of an eighth stereolithographic 3D printer, having a gap between the screen assembly and the free surface of the photopolymer.

FIG. 8 shows a cut-away side view of part of an eighth stereolithographic 3D printer, which is generally similar to the seventh 3D printer, shown in FIG. 7, and the description of like features and operations is omitted. The illustrated eighth 3D printer (optionally) omits the immersible window assembly 790 of the seventh 3D printer.

The control system of the eighth 3D printer is configured to control the depth of the photopolymer 836 in the vat 830, e.g. maintaining the free surface 836F of the photopolymer at a constant level. The control system is also configured to control the position of the screen assembly 850, maintaining the face of the screen 852 above the free surface of the photopolymer 836F by a small gap G. The gap G prevents the 3D printed object from adhering to the screen 852, with the upper face of each successive layer of the 3D printed object being formed at the free surface 836F of the photopolymer 836. The electromagnetic radiation from the screen 852 (a backlit visual display screen or an emissive pixel array screen) is collimated or substantially collimated (e.g. less than 15° divergence), and oriented substantially perpendicular to the free surface 836F. With the small gap G, the substantially collimated electromagnetic radiation maintains a high intensity contrast ratio in the patterned exposure, providing good resolution in the corresponding layer of the 3D printed object.

FIG. 8 shows the eighth stereolithographic 3D printer after the exposure. The control system is configured to lower the print platform 824, e.g. initially being lowered by more than the thickness of a layer of the 3D printed object 838, to allow liquid photopolymer to wash fully over the upper surface of the 3D printed object, before being raised back to the correct position for the next stereolithographic exposure.

The figures provided herein are schematic and not to scale. Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise. Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The reader's attention is directed to all papers and documents which are filed concurrently with or previous to this specification in connection with this application and which are open to public inspection with this specification, and the contents of all such papers and documents are incorporated herein by reference.

The invention claimed is:

1. A stereolithographic 3D printer comprising:
   a vat for liquid photopolymer, wherein the vat has a vat base that is resiliently deformable or has a resiliently deformable portion;
   a print platform;
   a screen assembly having a screen support assembly supporting a screen or a plurality of screens for providing an exposure of patterned electromagnetic radiation for selectively polymerising successive layers of photopolymer to build a 3D printed object on the print platform, the screen assembly further having a support face for contacting the vat base,
   an inflatable chamber provided between the screen or the plurality of screens and the vat base; and
   a control system for controlling the separation of the print platform and screen assembly parallel to a build direction, wherein the control system comprises a pump in fluid communication with the inflatable chamber, and the control system is configured to:
      inflate the inflatable chamber with the pump before the print platform is drawn away from the vat base or concurrently with the print platform being drawn away from the vat base following a stereolithographic exposure,
      subsequently move the print platform further away from the vat base while the inflatable chamber remains inflated until complete detachment of the 3D printed object from the vat base is achieved, and
      subsequently deflate the inflatable chamber after the 3D printed object is completely detached from the vat base and before the next stereolithographic exposure.

2. The stereolithographic 3D printer of claim 1, wherein the support face of the screen assembly further comprises a gulley for locating against the resiliently deformable vat base or resiliently deformable portion of the vat base.

3. The stereolithographic 3D printer of claim 2, wherein the gulley encircles the screen or the plurality of screens.

4. The stereolithographic 3D printer of claim 2, wherein the gulley comprises a plurality of gulley portions adjacent the screen or the plurality of screens.

5. The stereolithographic 3D printer of claim 1, wherein the inflatable chamber comprises a seal encircling the screen or the plurality of screens that seals the screen support assembly to the vat base.

6. The stereolithographic 3D printer of claim 1, wherein the inflatable chamber comprises an inflatable bag located between the screen or the plurality of screens and the resiliently deformable vat base or the resiliently deformable portion of the vat base.

7. The stereolithographic 3D printer of claim 1, wherein the control system is configured to deflate the inflatable chamber with the pump.

8. The stereolithographic 3D printer of claim 1, wherein the vat comprises a plurality of resiliently deformable vat side walls and the control system comprises an actuator configured to inwardly press opposing resiliently deformable vat side walls before the print platform is drawn away from the vat base following a stereolithographic exposure.

9. A stereolithographic 3D printer according to claim 1, wherein the control system is configured to move the print platform perpendicular to the build direction relative to the vat base before the print platform is drawn away from the vat base following a stereolithographic exposure.

10. The stereolithographic 3D printer of claim 1, wherein the control system is configured to deflate the inflatable chamber by opening a release valve in fluid communication with the inflatable chamber.

* * * * *